(12) United States Patent
Wosiński

(10) Patent No.: US 10,538,677 B2
(45) Date of Patent: Jan. 21, 2020

(54) COMPOSITION FOR IMPREGNATING MATERIALS TO SHIELD AGAINST THE EFFECTS OF ALTERNATING ELECTROMAGNETIC FIELDS, ITS APPLICATION IN COATING/IMPREGNATING FIBROUS AND/OR POROUS MATRICES AND MATERIALS CONTAINING THE SAME

(71) Applicants: Selena Labs Sp. z o.o., Dzierżoniów (PL); Stanislaw Wosinski, Gdansk (PL)

(72) Inventor: Stanislaw Wosiński, Gdańsk (PL)

(73) Assignee: Selena Labs Sp. z o.o. (PL)

( * ) Notice: Subject to any disclaimer, the term of this patent is extended or adjusted under 35 U.S.C. 154(b) by 126 days.

(21) Appl. No.: 15/533,515

(22) PCT Filed: Nov. 24, 2015

(86) PCT No.: PCT/IB2015/059065
§ 371 (c)(1),
(2) Date: Jun. 6, 2017

(87) PCT Pub. No.: WO2016/092399
PCT Pub. Date: Jun. 16, 2016

(65) Prior Publication Data
US 2017/0349765 A1    Dec. 7, 2017

(30) Foreign Application Priority Data

Dec. 10, 2014  (PL) .......................................... 410462

(51) Int. Cl.
*C09D 5/32* (2006.01)
*D06M 11/44* (2006.01)
(Continued)

(52) U.S. Cl.
CPC ............... *C09D 5/32* (2013.01); *D06M 11/44* (2013.01); *D06M 11/45* (2013.01); *D06M 11/76* (2013.01);
(Continued)

(58) Field of Classification Search
None
See application file for complete search history.

(56) References Cited

U.S. PATENT DOCUMENTS

| 3,599,210 A | 8/1971 | Stander |
| 5,001,005 A | 3/1991 | Blanpied |

(Continued)

FOREIGN PATENT DOCUMENTS

| CN | 103755333 A | 4/2014 |
| EP | 0312333 B1 | 1/1994 |

(Continued)

OTHER PUBLICATIONS

Blanchard et al., "Electromagnetic shielding by metallized fabric enclosure: Theory and experiment", IEEE Transactions on Electromagnetic Compatability, vol. 30, No. 3, Aug. 1988, pp. 282-288.
(Continued)

*Primary Examiner* — Shamim Ahmed
*Assistant Examiner* — Bradford M Gates
(74) *Attorney, Agent, or Firm* — Lerner, David, Littenberg, Krumholz & Mentlik, LLP

(57) ABSTRACT

A composition for application to a base material, rendering the base material able to shield alternating electromagnetic fields in the range from low frequencies up to radio frequencies, includes an aqueous solution of a hydratable salt; a modifier selected from the group consisting of acrylic dispersions, styrene-acrylic dispersions, silicone emulsions and combinations thereof; and an enhancing additive selected from the group consisting of surface active agents, (Continued)

aluminosilicates, silicates, soluble calcium compounds, insoluble calcium compounds, metal oxides, metalloid oxides and combinations thereof. The alternating field is shielded at least in the range from $10^{-2}$ Hz to $10^6$ Hz. The composition may be used to coat/impregnate fibrous and/or porous matrices.

12 Claims, 4 Drawing Sheets

(51) Int. Cl.
    *D06M 11/45*     (2006.01)
    *D06M 11/76*     (2006.01)
    *D06M 15/233*     (2006.01)
    *D06M 15/263*     (2006.01)
    *D06M 15/55*     (2006.01)
    *D06M 15/643*     (2006.01)

(52) U.S. Cl.
    CPC ........ *D06M 15/233* (2013.01); *D06M 15/263* (2013.01); *D06M 15/55* (2013.01); *D06M 15/643* (2013.01)

(56) References Cited

U.S. PATENT DOCUMENTS

| | | |
|---|---|---|
| 5,661,484 A | 8/1997 | Shumaker et al. |
| 6,028,266 A | 2/2000 | Birke |
| 6,320,123 B1 | 11/2001 | Reimers |
| 6,337,125 B1 | 1/2002 | Diaz et al. |
| 2005/0013661 A1 | 1/2005 | Saito et al. |
| 2005/0229327 A1 | 10/2005 | Casella et al. |

FOREIGN PATENT DOCUMENTS

| | | |
|---|---|---|
| EP | 0420513 B1 | 1/1995 |
| FR | 2695760 A1 | 3/1994 |
| JP | 10013081 A1 | 1/1998 |
| PL | 203956 B1 | 11/2009 |
| PL | 387274 A1 | 8/2010 |
| WO | 2002040799 A1 | 5/2002 |
| WO | 2003031722 A1 | 4/2003 |
| WO | 2010093270 A1 | 8/2010 |

OTHER PUBLICATIONS

Huo et al., "Polymeric nanocomposites for electromagnetic wave absorption", J. Mater. Sci., vol. 44, Issue 15, published online: Jun. 2, 2009, pp. 3917-3927.

International Search Report for Application No. PCT/IB2015/059065 dated Mar. 15, 2016, 4 pages.

Milham, Samuel, "Historical evidence that electrification caused the 20th century epidemic of "diseases of civilization"", Medical Hypotheses, vol. 74, Issue 2, Feb. 2010, pp. 337-345.

Qin et al., "Ferromagnetic mocrowires enabled multifunctional composit materials", Progress Mater. Sci. 58 Mar. 2013, pp. 183-259.

Schulz et al., "Shielding theory and practice", IEEE Trans. Electromagnetic Compatibility vol. 30, Issue 3, Aug. 1988, pp. 187-201.

COMPOSITION FOR IMPREGNATING MATERIALS TO SHIELD AGAINST THE EFFECTS OF ALTERNATING ELECTROMAGNETIC FIELDS, ITS APPLICATION IN COATING/IMPREGNATING FIBROUS AND/OR POROUS MATRICES AND MATERIALS CONTAINING THE SAME

The present invention relates to a composition for impregnating other materials, thus making them capable of shielding against the effects of alternating electromagnetic fields, including its use in coating and modifying construction materials, furniture, textiles, clothing and other materials. The invention can be applied in the construction industry, for household goods, for coating the structural elements of buildings and for shielding electrical and electronic devices.

The technological development of electromechanical, electronic, teletechnical and IT devices, as well as their rapidly increasing application, requires us to analyse the impact of electric (EF), magnetic (MF) and electromagnetic fields (EMF) on human health. The following organisations are involved in work on the problem: WHO (World Health Organization), European Commission: HEALTH & CONSUMER PROTECTION, International Commission on Non-Ionizing Radiation Protection and the IEEE (Institute of Electrical and Electronics Engineers). The analysis of health conditions in the USA during the rapid electrification process in the 1940's indicates that electromagnetic radiation contributes more to civilization diseases than the actual change in lifestyle [Medical Hypotheses 74 (2010) 337]. As we cannot give up using electrical devices, the only solution is to shield them. Classical materials for EF shielding are single-phase materials of high electric conductivity (metals, carbon, conductive polymers and their combinations) based on the Faraday cage effect. Metal foils and grids placed inside a polymer or glass, conductive polymers and materials made of cotton and polyester with woven-in micron diameter silver or stainless steel wires are applied as EF shields [IEEE Trans. Electromagnetic Compatibility 30 (1988) 187; ibid 30 (1988) 282].

These types of solutions are disclosed in U.S. Pat. No. 6,028,266—Low Frequency EMF Shield and U.S. Pat. No. 6,320,123—System and Method for Shielding Electrical Components From Electromagnetic Waves, including electric cable shielding. A novel solution is the application of multi-phase materials to form composites for EMF shielding, because when tailoring the properties of the component phases, their weight/volume ratio and connectivity, one can obtain materials with properties suited to the requirements of the intended application [J. Mater. Sci. 44 (2009) 3917; Progress Mater. Sci. 59 (2013) 183].

Many patented solutions are related to EMF shielding composites in the GHz frequency range. These solutions are disclosed in, among others, the following patents: U.S. Pat. No. 3,599,210, EP0312333B1, FR2695760A1, EP0420513B1, U.S. Pat. No. 5,661,484, and JP10013081. There are other inventions for EMF shielding composites having a wide range from Hz to GHz, such as in International Patent Application WO2002/40799A1, U.S. Pat. No. 6,337,125B1, International Patent Application WO2003031722A1 and Polish Patent PL203956. A wide EMF shielding range (from Hz to GHz) was given in International Patent Application WO 2002/40799A1, where the shielding material used a composite based on a matrix filed with cements, plaster or gypsum combined with various ashes, slag, micro-silica and limestone ($CaCO_3$ with admixtures) and components reflecting/absorbing electromagnetic radiation, such as exfoliated graphite, electrode graphite, graphite flakes, carbon fibres, soot, ferrites and carborundum (SiC). The shielding material contains 1-6 layers of metal grid and 0.5-60% w/w of iron filings. U.S. Pat. No. 6,337,125B1 presents devices and methods for the production of composites absorbing electromagnetic radiation that allows for an increased absorption rate and that are thinner and/or lighter than those previously used. These are a combination of synthetic dielectric materials either with a synthetic magnetic material or another material with high magnetic losses such that the dielectric permittivity and magnetic susceptibility are matched in the desired frequency range. The frequency absorption band is from 10 MHz to 10 GHz.

International Patent Application WO2003/031722A1 shows a composite composed of a suitably selected layer to reflect electromagnetic waves and an absorbing layer containing conductive fibres, e.g. carbon fibres of lengths chosen to suit the band of absorbed electromagnetic waves.

Polish Patent PL203956B1 shows a material absorbing electromagnetic waves in a frequency band from a few kHz to ~2 GHz as a nanocomposite composed of kaolinite stripes of relatively low permittivity and layers of polar organic molecules of high permittivity. The kaolinite packages are <1 nm thick, while a 0.2-2 nm layer of polar organic molecules is of imidazole. This is polar organic molecules intercalated with kaolinite.

Chinese patent application CN103755333 presents a composite composed of a matrix in the form of a silicone rubber foam filled with magnesium-barium-aluminum nanoferrite. In this case the radiation absorbent is the nanoferrite; however, the shielding frequency of the patented composite is not specified.

Polish patent application PL387274 presents an aqueous solution for impregnating materials to shield against alternating electric fields with low-frequency characteristics. This involves a liquid containing a hydratable salt or salt mixture from the set $MgCl_2$, $Na_3PO_4$, $CuSO_4$ and other hydratable salts, while the weight ratio of salt or salt mixture with water is in the range 1:1 to 1:100, and with the optional addition of a polymer from a group used for applying finishes to textiles, especially poly(vinyl acetate). FIG. 1 is a graph showing the absorption of an electric field according to the prior art, using a polyester material impregnated with an aqueous solution of $MgCl_2:H_2O$ in the ratio 1:20 with the addition of a poly(vinyl acetate) dispersion.

Generally, applied EMF shields in the low-frequency range using single-phase materials of high electric conductivity are heavy, expensive and usually require grounding. Moreover, the majority of shields use multi-phase systems: composites to shield EMF in the microwave band or from a few kHz to a few GHz, along with composites with specific shielding properties in the Hz-GHz range that also contain metal meshes and iron filling (thus requiring grounding). The search continues for a material able to shield EMF starting from low frequencies, i.e. from $10^{-2}$ Hz, to radio frequencies, i.e. up to $10^6$ Hz and higher, in the order of several GHz, without the need for grounding while remaining light and useable in various forms: foil, nonwoven, plaster, wall or wood, and could even shield at low relative humidities. Unexpectedly, all the above problems were solved by the present invention.

SUMMARY OF THE INVENTION

The present invention is a composition for application to a base material, thus rendering the base material able to shield against the effects of alternating electromagnetic fields. The composition includes an aqueous solution of a salt that may form hydrates or a combination of salts, at least one of which forms a hydrate; a modifier selected from the group consisting of acrylic dispersions, styrene-acrylic dispersions, silicone emulsions and combinations thereof; and an enhancing additive selected from the group consisting of surface active agents, aluminosilicates, silicates soluble calcium compounds, insoluble calcium compounds, metal oxides, metalloid oxides, and combinations thereof, wherein the base material is shielded from alternating electromagnetic fields at least in the range of $10^{-2}$ Hz to $10^6$ Hz. The surface active agents preferably are compounds selected from the group consisting of detergents, surfactants, emulsifiers, amphiphiles, defoamers, dispersants, and glycols. The aluminosilicates and silicates preferably are compounds selected from the group consisting of bentonite, kaolin, and talc. The insoluble calcium compounds preferably are compounds selected from the group consisting of powdered limestone and dolomite. The composition according to the invention preferably includes compounds selected from the group consisting of gypsum, calcium hydroxide, and Portland cement. The composition according to the invention preferably includes resins selected from the group consisting of alkyd resin in an organic solvent, epoxide resin in a solid state or a solution, phenol formaldehyde resin in ethanol, and silicone resin in a solution or a suspension. The compounds used that may form inorganic hydrates are: $MgCl_2$ ($MgCl_2.6H_2O$), $CaCl_2[CaCl_2.H_2O$, $CaCl_2.2H_2O$, $CaCl_2.6H_2O]$, $NaCO_3[NaCO_3.H_2O$, $NaCO_3.7H_2O$, $NaCO_3.10H_2O]$, LiCl [$LiClH_2O$, $LiCl.8H_2O$] and others. As polymer dispersions, either acrylic dispersions, styrene-acrylic dispersions or silicone emulsions can be used. The invention can use as enhancing additives surface active agents, i.e. defoamers such as a silicone oil emulsion, dispersants such as sodium polyacrylate, anionic active emulsifiers and viscosity enhancers such as carboxymethylcellulose and poly(ethylene oxide). Other compounds that can be used as enhancing additives include basic magnesium silicate [$Mg_3Si_4O_{10}(OH)_2$—talc], basic aluminum silicate [$Al_2Si_2O_5(OH)_4$—kaolinite, the main component of kaolin] and aluminosilicates in the form of bentonite, as well as calcium compounds including lime powder [>90% $CaCO_3$], dolomite powder [$(Ca, Mg)(CO_3)_2$], gypsum [$CaSO_4.2H_2O$] and Portland cement [$3CaO.SiO_2$ (50-65%), $2CaO.SiO_2$ (~20%), $4CaO.Al_2O_3.Fe_2O_3$ (~10%) and $3CaO.Al_2O_3$ (~10%)]. It is preferable that the hydratable salt:water weight ratio is in the range from the salt concentration in a saturated solution to 1:1,000, the polymer:water ratio is in the range from 1:1 to 1:2,000, and the weight ratio of surface active agents:water is in the range from 1:20 up to 1:10,000, while the inorganic modifiers:water weight ratio is in the range from 1:0.5 up to 1,000. Equally preferable for airtight gel shields, shielding occurs at frequencies up to 3 GHz.

Also disclosed is the use of the composition defined above for coating/impregnating fibrous and/or porous matrices, which after drying obtain EMF shielding properties, preferably for coating or modifying construction materials, furniture, textiles and clothing. Preferable construction materials according to the invention are primers, plaster/paint primers, paints, plastering mortars, laminates used in construction including roof membranes, vapour barrier laminates with particular application for roofs and other applications, vapour-permeable laminates, foils coated with the shielding solution, and textiles with shielding properties. The invention uses as fibrous materials cellulose, viscose, polyester and other polymer nonwoven, spun and knitted fabrics, while using as porous materials cement, different bricks, plaster, gypsum board, plasterboard, cement board, OSB and similar materials of different commercial names, wood, laminates and various vapour-permeable and vapour barrier roof membranes. Materials impregnated with the composition, such as nonwovens, spun or knitted materials or construction materials such as cement, plaster, gypsum board/plasterboard/cement board, ceramic materials, bricks, silicate blocks or wood, form a composite matrix whose EMF absorbing materials after drying are bound with water in the form of micro- and nanodroplets entrapped on the surface of pores/nanopores and modifier grains in the form of hydration water (connected with salts forming hydrates) and water absorbed in bulk (bentonite), as well as dispersed polymer particles and introduced modifier particles.

Also disclosed is electrical field shielding for construction materials, furniture, textiles or clothing characterised in that it contains the composition defined above.

A feature of the invention is the development of a shielding composition for impregnation of fibrous and/or porous materials intended for shielding electromagnetic fields in the low frequency band of $10^{-2}$ Hz up to radio frequencies, i.e. $10^6$ Hz. The composition is a mixture of an aqueous solution of one or more salts able to form hydrates, a polymer dispersion (acrylic or styrene-acrylic dispersion or silicone emulsion) and/or enhancing additives (surface active agents and/or silicates and aluminosilicates and/or water soluble and insoluble calcium compounds). Materials containing the composition according to the invention, such as nonwoven, spun or knitted materials and/or construction materials such as cements, gypsum board/plasterboard/cement board, ceramic materials/bricks, silicate blocks and/or wood, are composite matrices of static topology, which, after drying, shield electromagnetic radiation. The shielding properties of the composite are related to dielectric absorption arising from the dielectric losses of all composite components and with the Maxwell-Wagner polarization occurring in this composite related to the difference between the permittivity of the matrix and fillers, as well as of the entrapped water and modifiers. By changing the type and topology of the matrix, as well as the type and concentration of the hydratable salt, the concentration of the polymer dispersion, and the type and concentration of the enhancing additives, it is possible to adjust the shielding frequency band to suit the requirements of the application.

It is preferable for the matrix to have pores and/or slits and/or capillaries. Preferably, the composite matrix belongs to the group containing textiles, knitted materials, nonwovens, ceramics, wood, plastics, construction materials and various systems thereof. EMF shielding composites were produced and electric field shielding tests were carried out for different porous matrices such as ceramics, nonwoven and similar materials impregnated with impregnating solutions of various compositions. The effect of the matrix structure and type (such as porosity, weight, hydrophilic properties) was studied, as well as the effect of temperature and humidity. Shields manufactured according to the invention can be used for the production of different types of screens to be used in construction, such as nonwoven roofing, roof membranes, bricks, ceramic tiles, cement, mortar and plaster, paint, primers, and putty, or can be applied directly to a building wall to protect living organisms and electronic devices against the effects of alternating EMF. Shielding materials can also be used directly, e.g., for electrical outlets and electric cables. Another application of the impregnating solution is the production of whole-bed mats. Screens with a matrix made of nonwoven, spun or knitted materials can be used also for the production of clothing, bedsheets, quilts, tents, sleeping bags and foam pads. The protection of human health and electronic devices does not exhaust the uses of the present invention. The invention can be used for protecting rooms and buildings against electronic information leakage, etc.

DETAILED DESCRIPTION

Example 1

Figure 1:
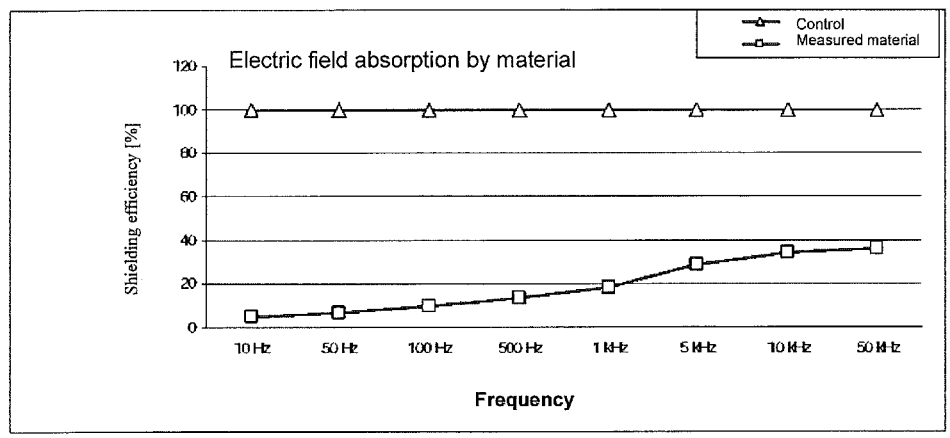
FIG. 1 is a graph showing the absorption of an electric field using an impregnated polyester material according to the prior art.
Figure 8:
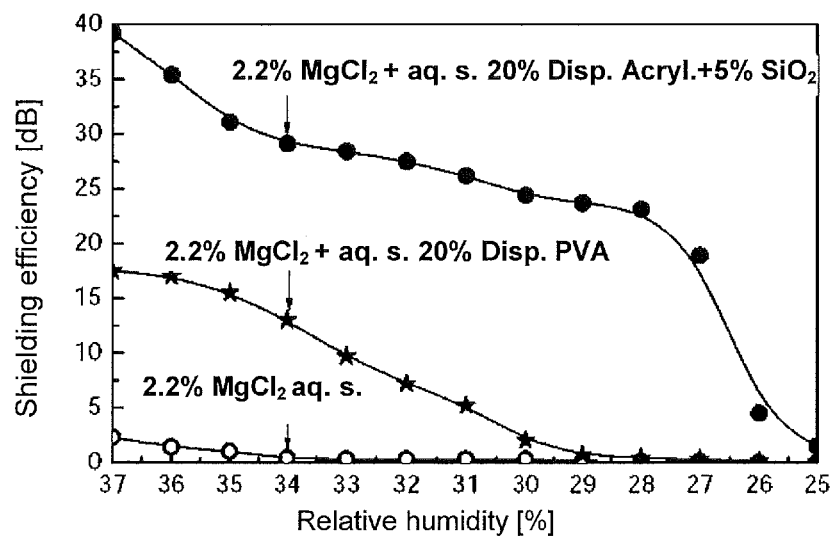
FIG. 8 is a graph showing a comparison of shielding for the invention described in patent application PL387274 and a composition according to the present invention with additions for low humidity environments.

In order to illustrate the advantages of the invention, its performance was compared with a prior known solution. As typical prior art for the present invention, the invention shown in patent application PL387274 is shown in FIG. 1, where a hydrophilic textile made of polyester was impregnated with an $MgCl_2$ solution at a temperature not exceeding 117° C. in order to obtain an EF shield. The solution was prepared in a weight ratio $MgCl_2 \cdot 6H_2O:H_2O$ equal to 1:20 with the addition of a poly(vinyl acetate) dispersion belonging to the group of polymers used for applying finishes to textiles in order to maintain the bonded hydrate. Subsequently, after draining, the fabric was dried and left to achieve ambient humidity—in order for separation of free water from the material to occur. After drying, the fabric absorbed the electrical component of electromagnetic waves in the low frequency band. The electric field shielding ability was determined using a Maschek ESM-100. A C&C generator FG-220C was used as the source of the alternating electric field. Measurement results from $10^1$ to $5 \times 10^4$ Hz are presented in FIG. 1 illustrating the dependence on the frequency of the electric field strength measured with an electric field meter for the modified fabric obtained according to the procedure described in Example 1 placed between the field meter and the antenna connected to the generator (see the curve with measurement points marked with squares, and the control measurement without modified fabric with measurement points marked with triangles). FIG. 8 shows a comparison of the shielding for the invention shown in patent application PL387274 and the composition according to the present invention containing 2.2% of $MgCl_2$ with the addition of a 20% acrylic dispersion and 5% silica at a relative humidity in the range of 25% to 37%.

Examples of the invention are presented in the Tables and in the figures presenting the measurement results of shielding efficiency. The Tables and figures present the measurement results of shielding efficiency (SE) $SE=(E_0-E_e)/E_0$ (where $E_0$ is the electric field strength in front of the screen and $E_e$ is the electric field strength behind the screen) or shielding efficiency in dB. Different matrices were impregnated with 16 g/m² of various compositions and then after 24 h the shielding efficiency was measured. The drying time of the impregnated matrix was chosen to be excessive, since as early as 10 h no changes in SE were observed. The polymers used in these examples were dispersions with a dispersed phase:water ratio of 1:1. Electric field strength was measured at ambient temperature using an electromagnetic field meter by Maschek Elektronik, ESM-100 3D H/E, in the frequency range from 5 Hz to 400 kHz. A rod antenna connected to a C&C FG-220C generator was used as the source of the alternating electric field. For a polypropylene nonwoven impregnated with a shielding component material, dielectric measurements were also carried out at ambient temperature using a broadband dielectric spectrometer by Novocontrol GmbH in the frequency range from $10^{-2}$ to $10^7$ Hz. Table 1 shows the increase of shielding efficiency of a model wall made of a matrix (PE+$CaCO_3$) after impregnation with various impregnating solutions: an aqueous solution of $MgCl_2$, a mixture of an aqueous solution of $MgCl_2$ with various concentrations of a PVA dispersion, and a mixture of an aqueous solution of $MgCl_2$ with a 20% PVA dispersion and various modifiers. The first four results and FIG. 1 illustrate the invention shown in Polish patent application PL387274. Depending on the modifier used, there was an increase in the shielding efficiency (SE) and significant broadening of the shielding frequency range towards the higher frequencies in comparison to the closest prior art (see results starting from No. 5 in Table 1), while the 20% concentration of added dispersion of PVA is close to an optimum concentration. The further results in Table 1 show the effect of modifiers: bentonite, sodium aluminosilicate, kaolin, titanium white, silica, talc, lime powder (natural and synthetic), dolomite powder, defoamer (emulsion of silicone oil), dispersant (sodium polyacrylate), poly(vinyl alcohol), carboxymethylcellulose and biocide (Kathon 886). Table 1 shows the shielding efficiency SE of an electric field determined by $SE=(E_0-E_e)/E_0$ as a percentage (where $E_0$ is the electric field strength in front of the screen and $E_e$ is the electric field strength behind the screen) for a matrix in the form of a polyethylene (PE) foil with calcium carbonate ($CaCO_3$), the matrix impregnated with a mixture of an aqueous solution of $MgCl_2$ with a PVA dispersion and various modifiers (specified percentage concentrations of additives are in wt percentage).

TABLE 1

| No. | matrix (PE + CaCO$_3$) + fillers | 2 kHz | 5 kHz | 10 kHz | 20 kHz | 50 kHz | 100 kHz | 200 kHz | 400 kHz |
|---|---|---|---|---|---|---|---|---|---|
| 1 | 2.2% of MgCl$_2$ aqueous solution (aq. s.) | 24.7 | 8.8 | 4.4 | 2.9 | 2.4 | 2.4 | 1.9 | 2.9 |
| 2 | 2.2% MgCl$_2$ aq. s. + 0.1% PVA dis. | 53.2 | 30.0 | 14.9 | 8.5 | 5.4 | 5.6 | 6.1 | 8.2 |
| 3 | 2.2% MgCl$_2$ aq. s. + 20% PVA dis. | 76.6 | 62.1 | 42.1 | 23.6 | 15.3 | 11.9 | 9.2 | 7.7 |
| 4 | 2.2% MgCl$_2$ aq. s. + 95.4% PVA dis. | 62.8 | 42.1 | 27.1 | 19.5 | 15.6 | 12.5 | 9.0 | 7.4 |
| 5 | no. 3 + 0.3% bentonite | 97.8 | 95.9 | 94.1 | 92.2 | 85.7 | 77.3 | 65.3 | 52.9 |
| 6 | no. 3 + 5% bentonite | 97.2 | 95.8 | 95.0 | 92.2 | 81.3 | 70.6 | 51.0 | 30.0 |
| 7 | no. 3 + 40% bentonite | 82.9 | 64.4 | 43.9 | 24.6 | 8.9 | 4.1 | 3.1 | 4.2 |
| 8 | no. 3 + 0.3% sodium aluminosilicate | 96.9 | 96.3 | 95.4 | 93.7 | 89.0 | 82.2 | 72.7 | 61.9 |
| 9 | no. 3 + 5% sodium aluminosilicate | 95.2 | 93.0 | 91.1 | 85.3 | 72.0 | 59.9 | 36.6 | 19.5 |
| 10 | no. 3 + 20% sodium aluminosilicate | 90.3 | 78.3 | 64.2 | 45.3 | 21.6 | 11.5 | 5.1 | 2.0 |
| 11 | no. 3 + 0.3% kaolin | 97.4 | 96.7 | 95.5 | 91.5 | 81.0 | 68.5 | 49.2 | 29.1 |
| 12 | no. 3 + 5% kaolin | 96.5 | 96.2 | 94.9 | 92.3 | 82.1 | 72.6 | 49.9 | 34.4 |
| 13 | no. 3 + 20% kaolin | 96.4 | 95.8 | 94.7 | 91.9 | 81.9 | 68.5 | 49.4 | 27.1 |
| 14 | no. 3 + 0.3% titanium white | 96.6 | 96.1 | 94.7 | 92.2 | 83.1 | 69.6 | 55.0 | 37.3 |
| 15 | no. 3 + 20% titanium white | 97.1 | 96.9 | 96.2 | 94.2 | 86.8 | 77.5 | 62.8 | 45.6 |
| 16 | no. 3 + 40% titanium white | 96.6 | 95.6 | 93.4 | 89.4 | 77.2 | 60.5 | 39.2 | 20.0 |
| 17 | no. 3 + 0.1% silica | 96.7 | 95.5 | 94.6 | 91.7 | 82.4 | 72.3 | 53.6 | 30.8 |
| 18 | no. 3 + 5% silica | 95.4 | 92.1 | 86.7 | 76.3 | 51.5 | 29.9 | 12.3 | 6.5 |
| 19 | no. 3 + 10% silica | 94.6 | 90.9 | 86.5 | 76.1 | 53.0 | 33.5 | 13.2 | 9.2 |
| 20 | no. 3 + 0.3% synth. lime powder | 96.7 | 95.8 | 94.2 | 90.9 | 80.2 | 66.4 | 48.9 | 35.1 |
| 21 | no. 3 + 5% synth. lime powder | 96.8 | 96.2 | 95.4 | 93.0 | 85.9 | 76.6 | 61.7 | 46.5 |
| 22 | no. 3 + 20% synth. lime powder | 96.6 | 95.4 | 93.4 | 89.4 | 76.0 | 59.6 | 40.8 | 25.3 |
| 23 | no. 3 + 0.3% nat. lime powder | 96.8 | 96.2 | 95.5 | 92.9 | 84.3 | 72.6 | 55.7 | 35.8 |
| 24 | no. 3 + 5% nat. lime powder | 96.5 | 95.8 | 94.9 | 93.1 | 87.1 | 76.6 | 65.9 | 53.5 |
| 25 | no. 3 + 20% nat. lime powder | 96.8 | 96.3 | 95.6 | 93.9 | 87.5 | 79.4 | 65.7 | 51.8 |
| 26 | no. 3 + 0.3% dolomite powder | 97.2 | 96.5 | 94.8 | 90.9 | 79.3 | 64.6 | 44.4 | 25.2 |
| 27 | no. 3 + 5% dolomite powder | 97.0 | 96.4 | 95.9 | 93.2 | 86.2 | 78.5 | 65.5 | 49.1 |
| 28 | no. 3 + 20% dolomite powder | 96.9 | 96.8 | 96.2 | 94.9 | 89.2 | 80.9 | 68.6 | 54.2 |
| 29 | no. 3 + 0.3% talc | 96.9 | 96.1 | 94.9 | 91.4 | 80.8 | 69.5 | 51.4 | 30.3 |
| 30 | no. 3 + 5% talc | 96.9 | 96.5 | 95.8 | 94.3 | 88.1 | 79.3 | 67.5 | 55.7 |
| 31 | no. 3 + 20% talc | 96.1 | 93.7 | 90.1 | 84.0 | 69.5 | 52.3 | 31.4 | 16.4 |
| 32 | no. 3 + 0.01% defoamer | 96.8 | 96.2 | 95.2 | 92.8 | 84.9 | 72.3 | 55.2 | 37.1 |
| 33 | no. 3 + 0.6% defoamer | 96.3 | 94.2 | 90.3 | 83.2 | 64.5 | 42.1 | 20.7 | 9.8 |
| 34 | no. 3 + 5% defoamer | 67.6 | 48.5 | 32.4 | 23.3 | 16.2 | 14.6 | 11.1 | 11.4 |
| 35 | no. 3 + 0.01% dispersant | 95.8 | 95.3 | 94.4 | 91.6 | 82.9 | 71.8 | 53.8 | 35.1 |
| 36 | no. 3 + 0.6% dispersant | 97.0 | 94.8 | 92.0 | 86.3 | 72.0 | 54.6 | 32.4 | 18.3 |
| 37 | no. 3 + 5% dispersant | 87.7 | 75.0 | 57.6 | 40.6 | 13.6 | 4.7 | 2.7 | 4.7 |
| 38 | no. 3 + 0.1% poly(vinyl alcohol) | 95.6 | 92.1 | 86.5 | 75.2 | 52.7 | 32.7 | 16.2 | 8.4 |
| 39 | no. 3 + 0.3% poly(vinyl alcohol) | 96.0 | 95.0 | 93.0 | 88.1 | 76.7 | 60.1 | 38.5 | 18.9 |
| 40 | no. 3 + 5% poly(vinyl alcohol) | 96.1 | 93.8 | 89.7 | 82.4 | 63.6 | 42.9 | 22.8 | 11.1 |
| 41 | no. 3 + 0.1% carboxymethylcellulose | 96.7 | 94.4 | 90.1 | 81.5 | 65.1 | 45.8 | 27.4 | 16.7 |
| 42 | no. 3 + 0.3% carboxymethylcellulose | 96.4 | 93.9 | 89.6 | 80.8 | 60.7 | 39.9 | 21.3 | 10.4 |
| 43 | no. 3 + 1% carboxymethylcellulose | 91.3 | 81.7 | 66.9 | 46.9 | 25.7 | 14.0 | 10.9 | 8.1 |
| 44 | no. 3 + 0.01% BIOCIDE | 95.7 | 92.6 | 88.3 | 79.7 | 61.5 | 42.2 | 22.3 | 11.3 |
| 45 | no. 3 + 0.1% BIOCIDE | 96.1 | 95.0 | 93.2 | 87.4 | 75.8 | 59.2 | 33.9 | 17.0 |
| 46 | no. 3 + 0.6% BIOCIDE | 95.2 | 94.1 | 91.8 | 85.8 | 70.8 | 52.2 | 27.9 | 14.4 |

Example 2

The tests carried out were as for Example 1, and Example 2 illustrates test results of EF shielding efficiency depending on frequency for a shield in the form of a polyethylene foil matrixed with calcium carbonate (CaCO$_3$) and impregnated with a mixture of an aqueous solution of MgCl$_2$ with an acrylic dispersion and various modifiers. Table 2 shows the shielding efficiency SE of an electric field determined by SE=($E_0$−$E_e$)/$E_0$ as a percentage (where $E_0$ is the electric field strength in front of the screen and $E_e$ is the electric field strength behind the screen) for a matrix in the form of a polyethylene (PE) foil with calcium carbonate (CaCO$_3$), the matrix impregnated with a mixture of an aqueous solution of MgCl$_2$ with an acrylic dispersion and various modifiers (specified percentage concentrations of additives are in wt percentage).

TABLE 2

| No. | matrix (PE + CaCO$_3$) | 2 kHz | 5 kHz | 10 kHz | 20 kHz | 50 kHz | 100 kHz | 200 kHz | 400 kHz |
|---|---|---|---|---|---|---|---|---|---|
| 1 | 2.2% MgCl2 Aqueous solution (aq. s.) | 24.7 | 8.8 | 4.4 | 2.9 | 2.4 | 2.4 | 1.9 | 2.9 |
| 2 | 2.2% MgCl$_2$ aq. s. + 0.1% acryl. dis. | 25.0 | 7.9 | 3.8 | 2.5 | 2.5 | 2.6 | 2.3 | 3.3 |
| 3 | 2.2% MgCl$_2$ aq. s. + 20% PVA dis. | 35.6 | 16.5 | 10.5 | 8.1 | 6.6 | 5.6 | 4.3 | 4.3 |
| 4 | 2.2% MgCl$_2$ aq. s. + 95.4% acryl. dis. | 31.2 | 9.4 | 3.8 | 2.1 | 2.4 | 2.5 | 2.3 | 3.2 |
| 5 | no. 3 + 0.3% bentonite | 47.7 | 34.7 | 23.2 | 11.7 | 6.7 | 5.7 | 4.4 | 3.1 |
| 6 | no. 3 + 1% bentonite | 73.0 | 49.0 | 30.6 | 13.1 | 6.0 | 2.9 | 2.7 | 3.6 |
| 7 | no. 3 + 2% bentonite | 67.3 | 41.6 | 21.4 | 12.8 | 6.1 | 4.8 | 4.7 | 5.1 |
| 8 | no. 3 + 5% bentonite | 64.3 | 37.5 | 22.0 | 13.7 | 8.4 | 6.3 | 4.4 | 4.5 |
| 9 | no. 3 + 40% bentonite | 81.7 | 62.6 | 43.7 | 26.4 | 12.9 | 6.9 | 4.3 | 4.7 |
| 10 | no. 3 + 0.3% sodium aluminosilicate | 47.4 | 27.1 | 19.6 | 15.3 | 12.3 | 9.8 | 6.8 | 7.0 |
| 11 | no. 3 + 5% sodium aluminosilicate | 63.4 | 37.3 | 23.7 | 15.4 | 9.8 | 7.3 | 5.4 | 5.1 |
| 12 | no. 3 + 20% sodium aluminosilicate | 88.0 | 72.6 | 55.1 | 32.5 | 11.1 | 5.0 | 2.4 | 3.1 |
| 13 | no. 3 + 0.3% kaolin | 57.5 | 38.1 | 26.5 | 16.9 | 9.1 | 6.1 | 2.8 | 3.3 |
| 14 | no. 3 + 5% kaolin | 88.6 | 75.8 | 58.0 | 35.7 | 13.0 | 5.3 | 2.1 | 3.0 |
| 15 | no. 3 + 20% kaolin | 97.6 | 96.6 | 94.2 | 89.3 | 75.2 | 56.9 | 33.6 | 14.8 |
| 16 | no. 3 + 0.3% titanium white | 63.5 | 41.0 | 28.6 | 20.6 | 13.5 | 8.8 | 4.9 | 3.3 |
| 17 | no. 3 + 20% titanium white | 79.1 | 55.3 | 34.0 | 16.3 | 5.9 | 3.1 | 2.0 | 3.7 |
| 18 | no. 3 + 40% titanium white | 97.6 | 95.5 | 92.0 | 84.7 | 64.9 | 43.3 | 20.2 | 7.4 |
| 19 | no. 3 + 0.1% silica | 39.9 | 17.8 | 9.6 | 5.3 | 3.5 | 3.0 | 2.0 | 4.1 |
| 20 | no. 3 + 2% silica | 70.6 | 46.3 | 27.4 | 12.8 | 7.8 | 5.6 | 4.5 | 7.1 |
| 21 | no. 3 + 5% silica | 96.6 | 94.7 | 91.0 | 83.3 | 63.8 | 41.1 | 18.4 | 6.7 |
| 22 | no. 3 + 10% silica | 96.3 | 96.0 | 95.1 | 93.0 | 86.3 | 76.0 | 59.7 | 42.5 |
| 23 | no. 3 + 0.3% nat. lime powder | 58.6 | 31.4 | 15.5 | 7.4 | 3.6 | 2.6 | 2.0 | 4.2 |
| 24 | no. 3 + 5% nat. lime powder | 91.6 | 82.4 | 68.4 | 48.7 | 25.5 | 14.1 | 6.5 | 5.3 |
| 25 | no. 3 + 20% nat. lime powder | 85.4 | 67.7 | 49.3 | 30.5 | 17.3 | 12.2 | 8.6 | 8.1 |

Example 3

The tests carried out were as for Example 1, and Example 3 illustrates test results of EF shielding efficiency depending on frequency for a shield in the form of a polyethylene foil matrixed with calcium carbonate (CaCO$_3$) and impregnated with a mixture of an aqueous solution of MgCl$_2$ with a styrene-acrylic dispersion and various modifiers. Table 3 shows the shielding efficiency SE of an electric field determined by SE=(E$_0$−E$_e$)/E$_0$ as a percentage (where E$_0$ is the electric field strength in front of the screen and E$_e$ is the electric field strength behind the screen) for a matrix in the form of a polyethylene (PE) foil with calcium carbonate (CaCO$_3$), the matrix impregnated with a mixture of an aqueous solution of MgCl$_2$ with styrene-acrylic dispersion and various modifiers (specified percentage concentrations of additives are in wt percentage).

TABLE 3

| No. | matrix (PE + CaCO$_3$) | 2 kHz | 5 kHz | 10 kHz | 20 kHz | 50 kHz | 100 kHz | 200 kHz | 400 kHz |
|---|---|---|---|---|---|---|---|---|---|
| 1 | 2.2% MgCl2 Aqueous solution (aq. s.) | 24.7 | 8.8 | 4.4 | 2.9 | 2.4 | 2.4 | 1.9 | 2.9 |
| 2 | 2.2% MgCl$_2$ + 0.1% styr.-acr. disp. | 25.0 | 10.9 | 8.2 | 5.8 | 5.5 | 5.6 | 5.0 | 6.1 |
| 3 | 2.2% MgCl$_2$ + 20% styr.-acr. disp. | 29.7 | 15.3 | 9.9 | 6.5 | 6.0 | 4.9 | 3.0 | 4.2 |
| 4 | 2.2% MgCl$_2$ + 95.4% styr.-acr. disp. | 91.3 | 80.6 | 65.4 | 44.0 | 20.5 | 10.8 | 5.8 | 5.0 |
| 5 | no. 3 + 0.3% bentonite | 37.2 | 15.3 | 8.3 | 6.3 | 6.0 | 5.5 | 4.8 | 6.0 |
| 6 | no. 3 + 5% bentonite | 93.9 | 88.7 | 79.6 | 63.6 | 36.8 | 19.7 | 10.5 | 7.7 |
| 7 | no. 3 + 40% bentonite | 93.9 | 87.1 | 77.2 | 61.1 | 33.8 | 17.3 | 6.3 | 7.5 |
| 8 | no. 3 + 0.3% sodium aluminosilicate | 59.4 | 35.1 | 20.1 | 12.8 | 8.9 | 7.1 | 5.8 | 6.4 |
| 9 | no. 3 + 5% sodium aluminosilicate | 64.6 | 37.8 | 22.0 | 13.0 | 7.7 | 5.8 | 4.5 | 5.3 |
| 10 | no. 3 + 20% sodium aluminosilicate | 83.5 | 62.5 | 41.6 | 20.2 | 7.2 | 4.9 | 4.0 | 4.9 |
| 11 | no. 3 + 0.3% kaolin | 27.7 | 9.3 | 4.6 | 3.2 | 3.1 | 3.1 | 2.7 | 3.5 |
| 12 | no. 3 + 5% kaolin | 56.8 | 30.6 | 20.0 | 12.8 | 9.5 | 9.1 | 7.4 | 8.7 |
| 13 | no. 3 + 20% kaolin | 96.4 | 94.6 | 90.2 | 82.2 | 62.3 | 40.4 | 20.5 | 10.2 |
| 14 | no. 3 + 0.3% titanium white | 47.2 | 24.0 | 13.7 | 9.0 | 6.7 | 5.6 | 4.7 | 5.3 |
| 15 | no. 3 + 20% titanium white | 97.0 | 94.9 | 91.4 | 84.2 | 64.8 | 42.8 | 21.5 | 9.9 |
| 16 | no. 3 + 40% titanium white | 95.9 | 94.7 | 92.2 | 87.1 | 72.4 | 52.3 | 28.9 | 12.3 |
| 17 | no. 3 + 0.1% silica | 42.2 | 19.7 | 10.7 | 5.8 | 4.1 | 3.5 | 2.7 | 3.3 |
| 18 | no. 3 + 5% silica | 96.4 | 96.1 | 95.0 | 92.4 | 84.4 | 72.5 | 53.7 | 34.2 |

TABLE 3-continued

| No. | matrix (PE + CaCO$_3$) | 2 kHz | 5 kHz | 10 kHz | 20 kHz | 50 kHz | 100 kHz | 200 kHz | 400 kHz |
|---|---|---|---|---|---|---|---|---|---|
| 19 | no. 3 + 10% silica | 96.1 | 94.3 | 85.6 | 83.5 | 65.1 | 43.7 | 23.3 | 10.8 |
| 20 | no. 3 + 0.3% synth. lime powder | 31.6 | 10.0 | 4.3 | 2.9 | 2.8 | 2.9 | 2.3 | 3.3 |
| 21 | no. 3 + 5% synth. lime powder | 70.0 | 45.9 | 29.1 | 18.1 | 11.1 | 8.0 | 5.7 | 5.9 |
| 22 | no. 3 + 20% synth. lime powder | 87.4 | 71.7 | 52.7 | 28.6 | 11.6 | 5.1 | 2.1 | 3.1 |
| 23 | no. 3 + 0.3% nat. lime powder | 38.3 | 14.7 | 6.8 | 4.2 | 3.3 | 2.9 | 2.0 | 3.2 |
| 24 | no. 3 + 5% nat. lime powder | 71.7 | 46.8 | 28.1 | 14.7 | 7.2 | 4.5 | 2.8 | 3.7 |
| 25 | no. 3 + 20% nat. lime powder | 84.0 | 67.6 | 50.0 | 32.0 | 15.1 | 7.3 | 4.1 | 4.2 |
| 26 | no. 3 + 0.3% talc | 36.3 | 15.9 | 9.1 | 5.8 | 4.7 | 4.1 | 3.4 | 4.7 |
| 27 | no. 3 + 5% talc | 70.1 | 46.9 | 29.8 | 16.0 | 6.3 | 2.7 | 1.1 | 1.5 |
| 28 | no. 3 + 20% talc | 74.0 | 55.6 | 42.7 | 32.9 | 23.8 | 16.9 | 10.4 | 6.6 |

Example 4

The tests carried out were as for Example 1, and Example 4 illustrates test results of EF shielding efficiency depending on frequency for a shield in the form of a polyethylene foil matrixed with calcium carbonate (CaCO$_3$) and impregnated with a mixture of an aqueous solution of MgCl$_2$ with a silicone emulsion and various modifiers. Table 4 shows the shielding efficiency SE of an electric field determined by SE=($E_0$-$E_e$)/$E_0$ as a percentage (where $E_0$ is the electric field strength in front of the screen and $E_e$ is the electric field strength behind the screen) for a matrix in the form of a polyethylene (PE) foil with calcium carbonate (CaCO$_3$), the matrix impregnated with a mixture of an aqueous solution of MgCl$_2$ with a silicone emulsion and various modifiers (specified percentage concentrations of additives are in wt percentage).

TABLE 4

| No. | matrix (PE + CaCO$_3$) | 2 kHz | 5 kHz | 10 kHz | 20 kHz | 50 kHz | 100 kHz | 200 kHz | 400 kHz |
|---|---|---|---|---|---|---|---|---|---|
| 1 | 2.2% MgCl$_2$ Aqueous solution (aq. s.) | 24.7 | 8.8 | 4.4 | 2.9 | 2.4 | 2.4 | 1.9 | 2.9 |
| 2 | 2.2% MgCl$_2$ aq. s. + 0.1% sil. emulsion | 95.8 | 93.6 | 90.8 | 85.4 | 68.1 | 51.8 | 32.3 | 18.5 |
| 3 | 2.2% MgCl$_2$ aq. s. + 20% sil. emulsion | 94.2 | 92.3 | 88.4 | 81.3 | 65.3 | 49.2 | 26.9 | 14.4 |
| 4 | 2.2% MgCl$_2$ aq. s. + 95.4% sil. emulsion | 62.7 | 37.8 | 20.4 | 13.9 | 10.5 | 8.0 | 5.5 | 6.4 |
| 5 | 2.2% MgCl$_2$ aq. s. + 0.3% tit. white | 36.4 | 13.7 | 8.8 | 6.2 | 5.1 | 4.8 | 4.6 | 4.7 |
| 6 | 2.2% MgCl$_2$ aq. s. + 20% tit. white | 38.1 | 20.3 | 12.7 | 8.5 | 7.7 | 5.7 | 4.2 | 4.2 |
| 7 | 2.2% MgCl$_2$ aq. s. + 40% tit. white | 97.2 | 96.2 | 94.2 | 90.4 | 79.6 | 63.7 | 43.2 | 24.0 |

Example 5

The tests carried out were as for Example 1, and Example 5 illustrates test results of EF shielding efficiency depending on frequency for a shield in the form of a polyethylene foil matrixed with calcium carbonate (CaCO$_3$) and impregnated with an aqueous solution of MgCl$_2$ and various modifiers. Table 5 shows the shielding efficiency SE of an electric field determined by SE=($E_0$-$E_e$)/$E_0$ as a percentage (where $E_0$ is the electric field strength in front of the screen and $E_e$ is the electric field strength behind the screen) for a matrix in the form of a polyethylene (PE) foil with calcium carbonate (CaCO$_3$), the matrix impregnated with an aqueous solution of MgCl$_2$ and various modifiers (specified percentage concentrations of additives are in wt percentage).

TABLE 5

| No. | matrix (PE + CaCO$_3$) | 2 kHz | 5 kHz | 10 kHz | 20 kHz | 50 kHz | 100 kHz | 200 kHz | 400 kHz |
|---|---|---|---|---|---|---|---|---|---|
| 1 | 2.2% MgCl$_2$ Aqueous solution (aq. s.) | 24.7 | 8.8 | 4.4 | 2.9 | 2.4 | 2.4 | 1.9 | 2.9 |
| 2 | no. 1 + 0.3% bentonite | 79.9 | 65.6 | 51.2 | 33.9 | 18.6 | 10.6 | 5.6 | 3.9 |
| 3 | no. 1 + 5% bentonite | 96.4 | 96.0 | 95.6 | 94.8 | 92.6 | 87.9 | 77.9 | 69.9 |
| 4 | no. 1 + 40% bentonite | 95.9 | 92.9 | 88.4 | 77.3 | 61.0 | 40.9 | 20.9 | 11.1 |
| 5 | no. 1 + 0.3% sod.-alum. silicate | 53.2 | 28.6 | 12.8 | 3.4 | 3.1 | 2.4 | 1.4 | 2.0 |
| 6 | no. 1 + 5% sod.-alum. silicate | 21.1 | 8.3 | 3.0 | 0.3 | 1.9 | 1.1 | 0.9 | 0.9 |
| 7 | no. 1 + 20% sod.-alum. silicate | 18.3 | 4.1 | 0.4 | 0.2 | 0.2 | 0.2 | 0.1 | 0.2 |
| 8 | no. 1 + kaolin 0.3% | 90.9 | 84.1 | 79.3 | 75.9 | 68.5 | 55.9 | 40.5 | 30.6 |
| 9 | no. 1 + 5% kaolin | 96.0 | 94.8 | 92.9 | 89.2 | 80.2 | 68.2 | 52.9 | 43.3 |
| 10 | no. 1 + 20% kaolin | 97.3 | 97.1 | 96.8 | 95.9 | 92.4 | 86.3 | 76.8 | 67.0 |
| 11 | no. 1 + 0.3% titanium white | 86.3 | 79.7 | 73.9 | 62.7 | 40.3 | 21.9 | 8.5 | 4.2 |
| 12 | no. 1 + 20% titanium white | 95.5 | 92.4 | 86.5 | 75.8 | 52.1 | 28.0 | 12.1 | 8.1 |
| 13 | no. 1 + 40% titanium white | 97.1 | 96.0 | 93.6 | 89.5 | 76.4 | 58.8 | 42.4 | 26.4 |
| 14 | no. 1 + 0.1% silica | 87.3 | 79.5 | 69.6 | 54.1 | 32.5 | 15.8 | 6.6 | 2.7 |
| 15 | no. 1 + 5% silica | 73.4 | 52.7 | 34.4 | 18.9 | 10.9 | 7.2 | 4.9 | 4.5 |
| 16 | no. 1 + 10% silica | 72.6 | 51.1 | 33.4 | 16.7 | 9.2 | 5.2 | 2.8 | 2.0 |
| 17 | no. 1 + 0.3% synth. lime powder | 59.0 | 35.7 | 19.4 | 8.7 | 6.5 | 5.0 | 3.6 | 4.1 |
| 18 | no. 1 + 5% synth. lime powder | 94.1 | 93.8 | 93.5 | 92.4 | 88.8 | 81.3 | 70.5 | 60.7 |
| 19 | no. 1 + 20% synth. lime powder | 96.8 | 96.2 | 95.2 | 93.1 | 87.5 | 78.7 | 66.4 | 52.7 |
| 20 | no. 1 + 0.3% nat. lime powder | 61.7 | 45.0 | 26.9 | 13.7 | 8.5 | 6.0 | 4.2 | 4.7 |
| 21 | no. 1 + 5% nat. lime powder | 88.5 | 78.5 | 66.4 | 49.6 | 29.2 | 17.2 | 10.1 | 6.6 |
| 22 | no. 1 + 20% nat. lime powder | 96.8 | 96.4 | 95.8 | 94.2 | 90.8 | 85.2 | 77.1 | 65.1 |
| 23 | no. 1 + 5% dolomite powder | 85.0 | 76.1 | 66.6 | 50.3 | 28.4 | 14.9 | 7.3 | 6.5 |
| 24 | no. 1 + 0.3% dolomite powder | 76.6 | 63.4 | 48.8 | 29.6 | 15.2 | 7.9 | 3.8 | 3.4 |
| 25 | no. 1 + 20% dolomite powder | 96.4 | 96.3 | 96.3 | 96.1 | 94.9 | 93.2 | 90.4 | 82.8 |
| 26 | no. 1 + 0.3% talc | 76.6 | 59.6 | 43.6 | 23.7 | 12.4 | 5.9 | 3.1 | 2.1 |
| 27 | no. 1 + 5% talc | 96.5 | 96.4 | 96.3 | 95.7 | 93.0 | 87.6 | 77.4 | 70.0 |
| 28 | no. 1 + 20% talc | 96.1 | 95.6 | 95.0 | 93.3 | 87.4 | 78.0 | 61.7 | 48.7 |
| 29 | no. 1 + 0.01% defoamer | 39.9 | 17.5 | 8.1 | 4.4 | 4.3 | 3.3 | 2.5 | 2.8 |
| 30 | no. 1 + 0.6% defoamer | 86.1 | 77.7 | 69.9 | 56.2 | 33.5 | 16.4 | 4.8 | 2.2 |
| 31 | no. 1 + 5% defoamer | 56.8 | 33.8 | 19.8 | 9.6 | 6.3 | 3.7 | 1.4 | 0.9 |
| 32 | no. 1 + 0.01% dispersant | 48.0 | 20.9 | 8.2 | 2.1 | 3.1 | 2.6 | 2.2 | 2.2 |
| 33 | no. 1 + 0.6% dispersant | 78.0 | 65.4 | 50.5 | 31.6 | 17.8 | 9.5 | 4.5 | 2.8 |
| 34 | no. 1 + 5% dispersant | 80.3 | 68.6 | 54.0 | 36.2 | 17.2 | 7.5 | 3.0 | 1.7 |

Example 6

The tests were conducted as for Example 1, and Example 6 illustrates test results of EF shielding efficiency tests depending on frequency for a shield with a matrix in the form of a polyethylene foil (PE) with calcium carbonate (CaCO$_3$) and impregnated with an aqueous solution of MgCl$_2$ with various modifiers. Table 6 shows the shielding efficiency SE of an electric field of various frequencies determined by SE=(E$_0$−E$_e$)/E$_0$ as a percentage (where E$_0$ is the electric field strength in front of the screen and E$_e$ is the electric field strength behind the screen) for a matrix in the form of a polyethylene (PE) foil with calcium carbonate (CaCO$_3$), the matrix impregnated with an aqueous solution of MgCl$_2$ with various modifiers (specified percentage concentrations of additives are in wt percentage).

In summary, it can be stated that it is possible to obtain EF shields of high efficiency in a broad range of field frequencies. It is very effective to use a mixture of an aqueous solution of MgCl$_2$ with a styrene-acrylic dispersion, which has to be added in an amount of ~90% (Table 3), and a silicone emulsion, where even the addition of a fraction of a percent is active (Table 4). Shielding efficiency and frequency range is increased by the addition of modifiers, e.g. a few to a few dozen percent of bentonite, sodium aluminum silicate, titanium white, lime powder, dolomite powder and talc.

Subsequently, as can be seen in Examples 1-7, the optimum concentrations of these additives when an aqueous solution of MgCl$_2$ is used depend both on the matrix type and the type of polymer dispersion.

TABLE 6

| No. | matrix (PE + CaCO$_3$) | 2 kHz | 5 kHz | 10 kHz | 20 kHz | 50 kHz | 100 kHz | 200 kHz | 400 kHz |
|---|---|---|---|---|---|---|---|---|---|
| 1 | 2.2% MgCl$_2$ Aqueous solution (aq. s.) | 24.7 | 8.8 | 4.4 | 2.9 | 2.4 | 2.4 | 1.9 | 2.9 |
| 2 | 2.2% MgCl$_2$ + 0.6% empilan 2502 detergent | 81.8 | 63.6 | 42.5 | 28.0 | 10.7 | 7.3 | 6.6 | 8.6 |
| 3 | 2.2% MgCl$_2$ + 0.6% elfacoze 200 detergent | 73.3 | 56.3 | 41.1 | 26.7 | 15.4 | 10.8 | 8.1 | 7.2 |
| 4 | 2.2% MgCl$_2$ + 0.6% emulgin | 72.9 | 62.6 | 46.6 | 29.5 | 13.6 | 6.4 | 4.5 | 3.7 |
| 5 | 2.2% MgCl$_2$ + 0.6% PEG 22 | 74.3 | 58.4 | 43.7 | 29.3 | 16.8 | 11.9 | 9.3 | 8.0 |

Example 7

Loose construction materials (increasing shielding range) were added to powdered hexahydrated magnesium chloride in the ratios given in Table 7. The following materials were used: synthetic gypsum, natural gypsum, cement, and slaked lime, and comminuted to obtain a homogenous powder mixture. Water was added to the mixture to obtain a suitable consistency and the mixture was used to coat a nonwoven polypropylene matrix of 25 g/m² basic weight. After drying, an EF shield was obtained and shielding efficiency measurements were carried out in the frequency range of 2 kHz-400 kHz with the results given in Table 7 illustrating the shielding efficiency SE of an electric field of various frequencies determined by $SE=(E_0-E_e)/E_0$ as a percentage (where $E_0$ is the electric field strength in front of the screen and $E_e$ is the electric field strength behind the screen) for a shield prepared according to the above description (specified percentage concentrations of additives are in wt percentage).

TABLE 7

| No. | Matrix: nonwoven | 2 kHz | 5 kHz | 10 kHz | 20 kHz | 50 kHz | 100 kHz | 200 kHz | 400 kHz |
|---|---|---|---|---|---|---|---|---|---|
| 1 | 2.2% MgCl₂ Aqueous solution (aq. s.) | 84.4 | 68.7 | 54.8 | 40.5 | 25.0 | 14.1 | 8.1 | 5.3 |
| 2 | aq.s. 50% synth. gypsum - control | 42.0 | 28.4 | 18.0 | 9.0 | 6.2 | 3.8 | 1.6 | 1.5 |
| 3 | 2.2% MgCl₂ aq. s. + 0.1% synth. gypsum | 95.8 | 93.6 | 89.5 | 81.6 | 63.6 | 42.4 | 24.3 | 13.0 |
| 4 | 2.2% MgCl₂ aq. s. + 5% synth. gypsum | 97.2 | 96.2 | 94.5 | 89.2 | 78.5 | 62.9 | 40.1 | 24.8 |
| 5 | 2.2% MgCl₂ aq. s. + 50% synth. gypsum | 97.8 | 97.6 | 96.8 | 95.0 | 89.4 | 80.8 | 70.0 | 58.5 |
| 6 | 2.2% MgCl₂ aq. s. + 70% synth. gypsum | 98.0 | 97.7 | 97.1 | 95.2 | 90.5 | 83.0 | 70.2 | 56.6 |
| 7 | nat. gypsum - control | 41.4 | 27.0 | 17.0 | 8.7 | 6.7 | 4.6 | 2.8 | 3.6 |
| 8 | 2.2% MgCl₂ aq. s. + 0.1% nat. gypsum | 96.9 | 95.8 | 93.2 | 88.1 | 73.7 | 55.6 | 35.0 | 18.0 |
| 9 | 2.2% MgCl₂ aq. s. + 5% nat. gypsum | 97.1 | 96.4 | 94.9 | 90.4 | 80.5 | 65.4 | 44.7 | 27.8 |
| 10 | 2.2% MgCl₂ aq. s. + 50% nat. gypsum | 96.8 | 96.9 | 96.8 | 96.3 | 94.1 | 89.8 | 83.2 | 74.9 |
| 11 | 2.2% MgCl₂ aq. s. + 70% nat. gypsum | 96.9 | 96.8 | 96.2 | 94.2 | 89.0 | 80.1 | 64.1 | 48.8 |
| 12 | 50% cement - control | 2.8 | 1.3 | 0.6 | 0.2 | 0.1 | 0.3 | 0.2 | 0.6 |
| 13 | 2.2% MgCl₂ aq. s. + 0.1% cement | 96.8 | 95.6 | 93.1 | 88.4 | 75.6 | 58.9 | 38.8 | 23.6 |
| 14 | 2.2% MgCl₂ aq. s. + 5% cement | 97.0 | 96.4 | 94.9 | 90.8 | 80.9 | 66.2 | 46.1 | 30.6 |
| 15 | 2.2% MgCl₂ aq. s. + 10% cement | 97.0 | 96.8 | 96.1 | 94.0 | 87.6 | 77.0 | 62.2 | 48.9 |
| 16 | 2.2% MgCl₂ aq. s. + 30% cement | 96.4 | 94.4 | 90.8 | 82.2 | 65.5 | 46.2 | 24.1 | 11.6 |
| 17 | 2.2% MgCl₂ aq. s. + 50% cement | 82.1 | 63.1 | 47.4 | 32.3 | 16.5 | 7.2 | 1.3 | 0.2 |
| 18 | 2.2% MgCl₂ aq. s. + 70% cement | 55.0 | 37.5 | 26.3 | 11.7 | 4.6 | 1.2 | 0.9 | 0.1 |
| 19 | 2.2% MgCl₂ aq. s. + 0.1% Ca(OH)2 | 83.5 | 71.0 | 58.4 | 41.9 | 25.3 | 15.8 | 9.2 | 6.6 |
| 20 | 2.2% MgCl₂ aq. s. + 0.6% Ca(OH)2 | 93.8 | 86.8 | 77.1 | 60.9 | 38.9 | 24.1 | 13.9 | 9.9 |
| 21 | 2.2% MgCl₂ aq. s. + 5% Ca(OH)2 | 95.9 | 95.5 | 94.8 | 92.5 | 84.9 | 72.4 | 54.2 | 42.1 |

Example 8

An impregnating solution of a mixture of an aqueous 2.2% MgCl₂ solution with a 20% PVA dispersion and a 0.3% addition of bentonite was applied to commercially available construction materials in the form of:
  a) plasterboard,
  b) gypsum plaster wall,
  c) OSB board.

The measured shielding efficiency for impregnated and dried boards is specified in Table 8, showing the decrease in electric field strength at the 50 Hz frequency due to the commercially available construction boards both before and after impregnation with a 2.2% MgCl₂ mixture of an aqueous solution with a 20% PVA dispersion and a 0.3% addition of bentonite.

TABLE 8

| | Plasterboard V/m | Gypsum plaster wall V/m | OSB board V/m |
|---|---|---|---|
| Electric field strength (control) | 150 | 150 | 150 |
| Electric field strength after shielding with board | 137 | 139 | 145 |
| Electric field strength after shielding with board painted once with shielding liquid | 4 | 3 | 6 |
| Electric field strength after shielding with board painted twice with shielding liquid | 1 | 2 | 3 |

Example 9

Figure 2:
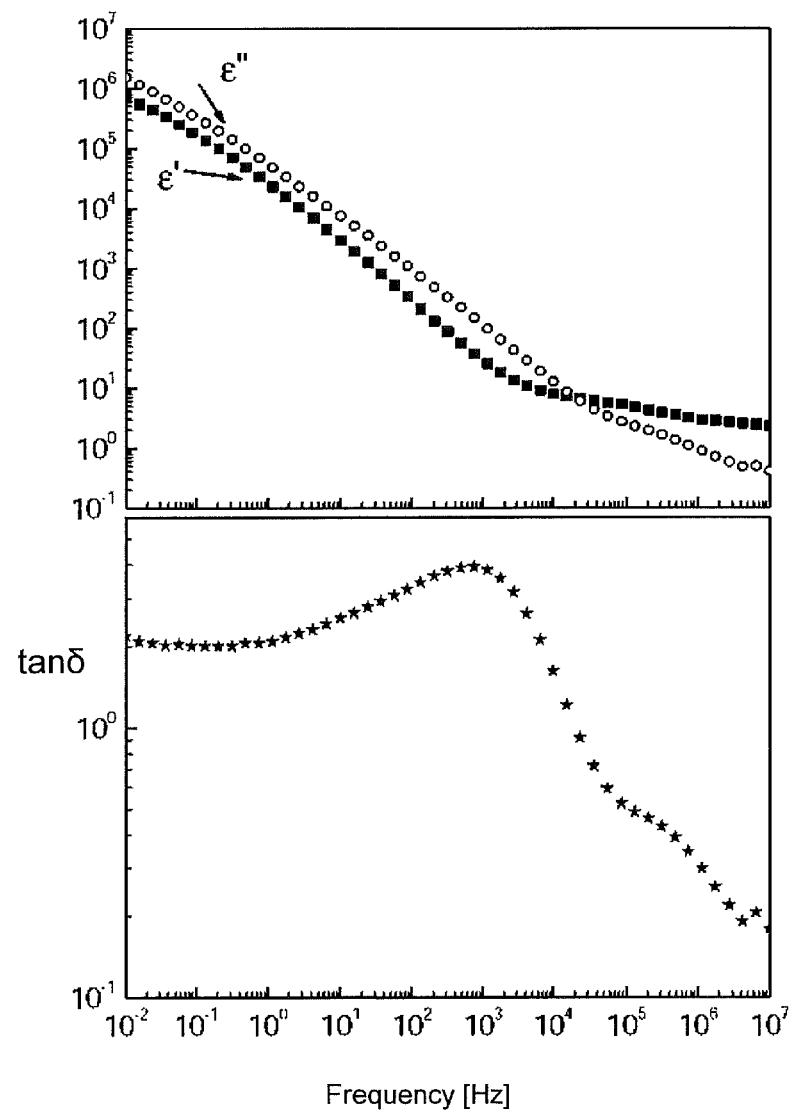
FIG. 2 is a graph showing the dependence of the real and imaginary part of permittivity ($\varepsilon'$, $\varepsilon''$) and dielectric losses (tan $\delta$) on frequency for a foil-screen produced on a production line.
Figure 3:
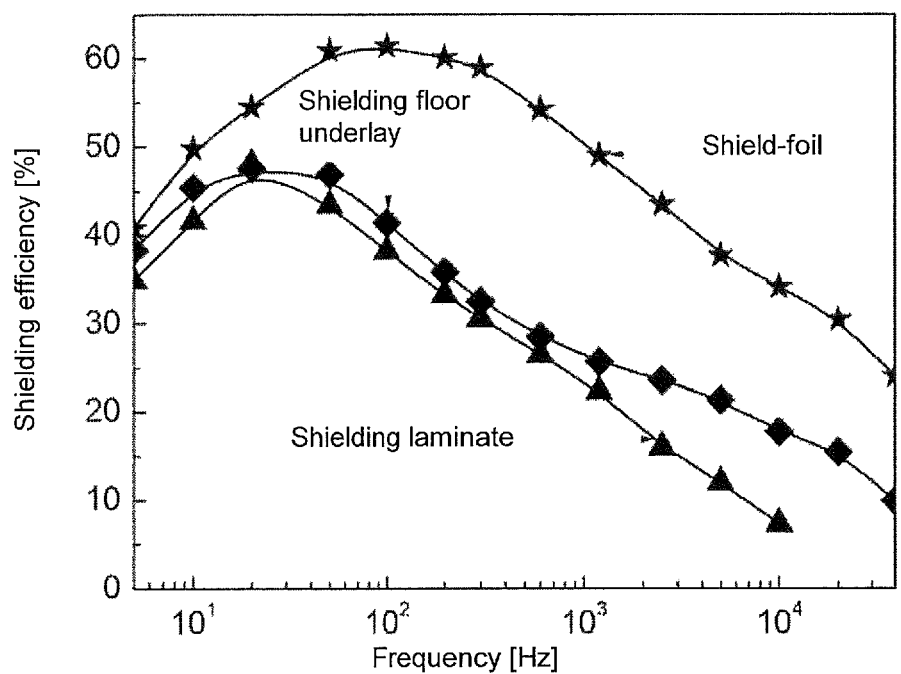
FIG. 3 is a graph showing the dependency of shielding efficiency on frequency for various screens.

A foil-shield developed for protecting large surfaces (large devices, places of sleep) against low-frequency EF (up to approx. 20 kHz), produced on a production line. A polypropylene nonwoven of 25 g/m² basic weight was unwound continuously from a horizontally placed bale, dragged through a bath containing the impregnating solution at room temperature, then pressed using a mangle and dried at 95° C. (for 0.5 min at a distance of 5 m) and wound on a roll. The bath contained a mixture of a 2.2% aqueous $MgCl_2$ solution with a 20% PVA dispersion with the addition of 0.5% of bentonite and 0.1% of silica. The basic weight of the modified nonwoven increased by 30% in comparison with the basic weight of the non-modified nonwoven. Subsequently, the nonwoven was subjected to another treatment involving hot drenching on both sides with a polyethylene film. Such a screen-foil is impermeable to water and can be used as roof insulation, under floors and in walls. Dielectric measurements (FIG. 2) show that the obtained screen-foil exhibits dielectric losses (tan δ>1) in the low frequency range from $10^{-2}$ Hz to $10^7$ Hz. Dependence of shielding efficiency on frequency for this screen is presented by the curve with data points in FIG. 3.

Example 10

A shielding laminate was developed for protecting large surfaces against low-frequency EF (up to approx. 20 kHz). A mixture was formulated of 2.2% aqueous $MgCl_2$ solution, a 20% PVA dispersion and 30% acrylic glue with the addition of 0.5% of bentonite and 0.1% of silica. The glue was used to join two layers of foil and, after drying at ambient temperature for approx. one week, an EF shielding laminate was obtained. The foil layers were made of vapour-permeable polyethylene foils with calcium carbonate inclusions. The amount of glue used was 16 g per 1 m² of the foil. The dependence of EF shielding efficiency for such a laminate on frequency is presented by the curve with data points in FIG. 3.

Example 11

A shielding floor underlay was developed to protect large surfaces against low-frequency EF (up to approx. 20 kHz), using a mixture of a 2.2% aqueous $MgCl_2$ solution, a 20% PVA dispersion and 3% of acrylic glue with the addition of 0.5% of bentonite, 0.1% of silica, and 0.3% of kaolin. The glue was sprayed on XPS floor underlays and dried at 60° C. with ventilation. The amount of glue used was 5 g per 1 m² of the underlay. The obtained material absorbs the electrical component of EMF, which is shown by the curve with data points in FIG. 3.

Example 12

Shielding paint was produced using a mixture of a 2.2% aqueous $MgCl_2$ solution, a 20% PVA dispersion and 0.4% bentonite, 2% kaolin, 0.1% of silica, and 0.5% of surface active agents. Primer paint (16 g/m²) intended for painting walls was applied with a paint roller on porous foil made of polyethylene with calcium carbonate inclusions that simulated a wall. After drying the foil painted with the primer shields low-frequency EF, as shown in Table 9 presenting the shielding efficiency SE of an electric field of various frequencies determined by $SE=(E_0-E_e)/E_0$ as a percentage (where $E_0$ is the electric field strength in front of the screen and $E_e$ is the electric field strength behind the screen) for a matrix in the form of a polyethylene (PE) foil with calcium carbonate ($CaCO_3$) painted with the shielding primer.

TABLE 9

| No. | matrix (PE + $CaCO_3$) | 50 Hz | 2 kHz | 5 kHz | 10 kHz | 20 kHz | 50 kHz | 100 kHz | 200 kHz | 400 kHz |
|---|---|---|---|---|---|---|---|---|---|---|
| 1 | Shielding primer | 98.9 | 97.1 | 95.3 | 92.2 | 85.8 | 67.2 | 49.1 | 27.7 | 12.0 |

Example 13

Figure 4:
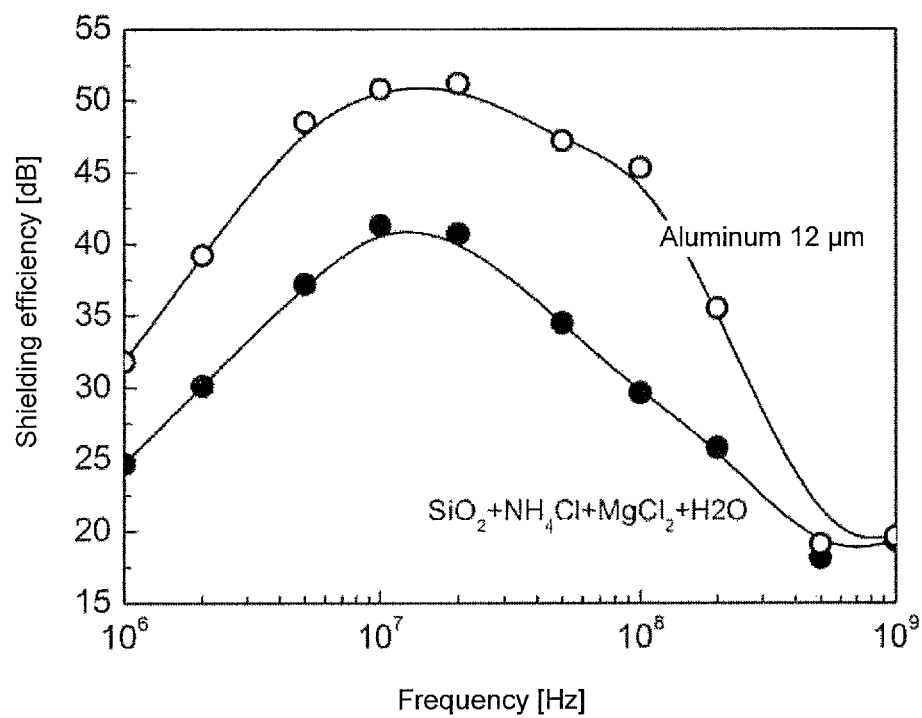
FIG. 4 is a graph showing a comparison of shielding efficiency dependence on frequency for a screen in the form of 12 m thick aluminum foil and a screen containing gel and an aqueous solution of $NH_4Cl$ and $MgCl_2$ with the addition of $SiO_2$.
Figure 5:
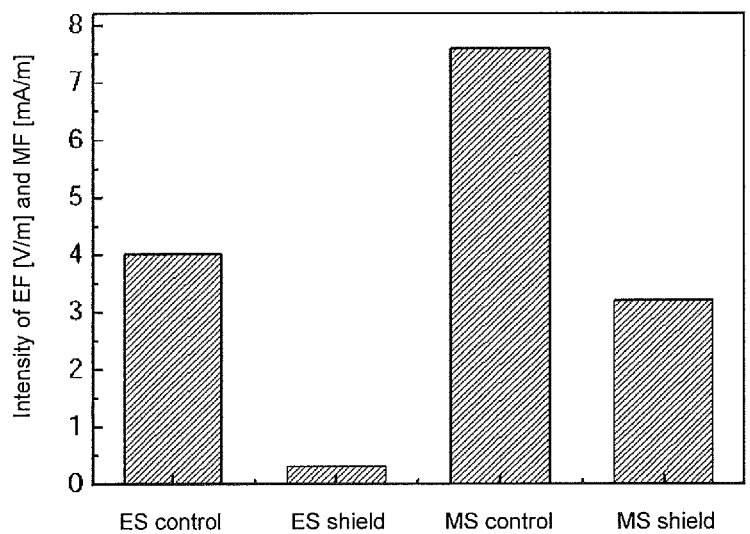
FIG. 5 is a bar graph showing a comparison of the dependence of shielding efficiency on the electric and magnetic component for a gel screen at a frequency of 27 MHz.

A gel high-frequency EMF screen was developed in order to shield equipment for nuclear magnetic resonance (NMR) and electron paramagnetic resonance (EPR). The screen uses an encapsulated airtight gel produced on an aqueous base using 7% silica, 5% $NH_4Cl$, 5% $MgCl_2$ and 1% aluminum-sodium silicate. FIG. 4 presents the frequency characteristics of the attenuation efficiency of the gel placed between two poly(vinyl chloride) (PCV) foils, between which a nonwoven was placed to maintain a fixed screen thickness. The thickness of the gel layer was 1 mm. FIG. 5 presents the shielding efficiency at a frequency of 27 MHz for the same gel shield.

Example 14

Figure 6:
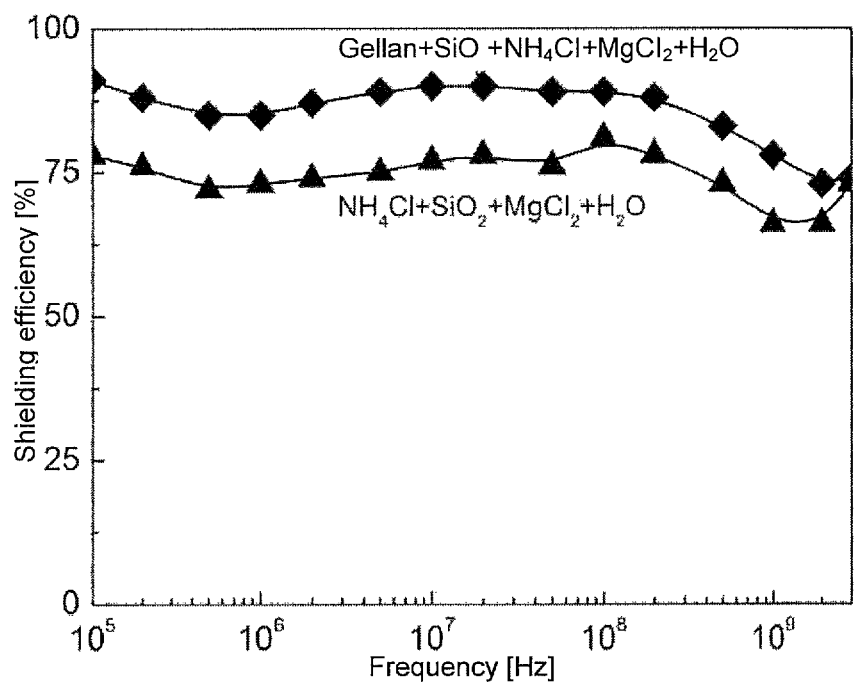
FIG. 6 is a graph showing a comparison of the dependence of shielding efficiency on frequency for a screen containing an aqueous solution of gel $NH_4Cl$ and $MgCl_2$ with the addition of $SiO_2$ and a screen additionally containing gel gellan.
Figure 7:
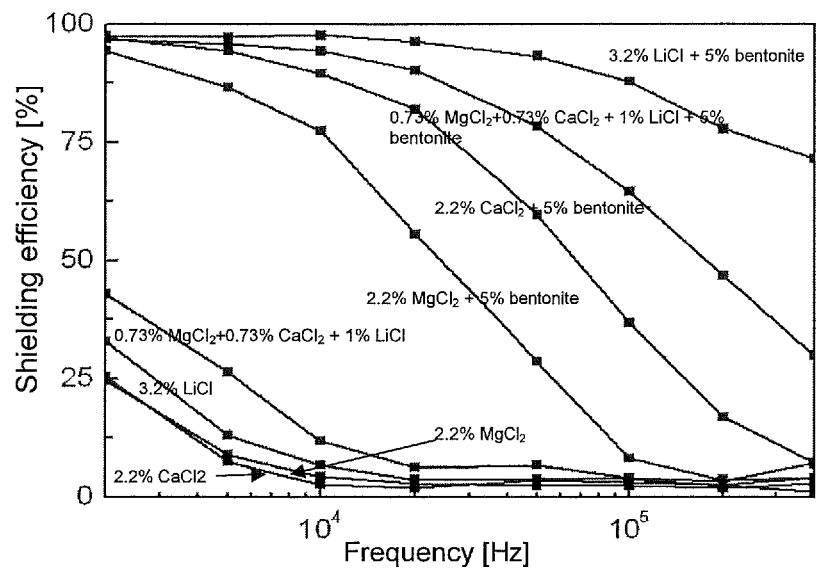
FIG. 7 is a graph showing a comparison of the dependence of shielding efficiency SE on frequency for an electric field determined as $SE=(E_0-E_e)/E_0$ as a percentage (where $E_0$ is the electric field strength in front of the screen and $E_e$ is the electric field strength behind the screen) for screens with a matrix in the form of a polyethylene (PE) foil with calcium carbonate ($CaCO_3$) impregnated with various aqueous solutions of hydratable salts with the addition of bentonite (specified percentage concentration of additives are in wt percentage)

A gel high-frequency EMF screen was developed in order to shield equipment for nuclear magnetic resonance (NMR) and electron paramagnetic resonance (EPR). The screen uses an encapsulated airtight gel produced on an aqueous base using gellan, silica, ammonium chloride, and magnesium chloride. FIG. 6 presents the frequency characteristics of the SE of the gel with additives placed between the poly(vinyl chloride) foil, between which a nonwoven was placed to maintain a fixed screen thickness. The thickness of the gel layer was 1 mm.

Tables 10 and 11 present a comparison of the EF shielding efficiency by a screen using the same matrix with different fillers. Table 10 compares the 50 Hz EF shielding efficiency of a screen using a matrix in the form of a polyethylene (PE) foil with calcium carbonate ($CaCO_3$) and impregnated with various impregnating solutions, while Table 11 presents the shielding efficiency of a polypropylene nonwoven impregnated with an aqueous $MgCl_2$ solution with various modifiers in percentage.

TABLE 10

| no. | Matrix (PE + CaCO$_3$) | acrylic dispersion [dB] | silicone dispersion [dB] | styr.-acryl dispersion [dB] | PVA dispersion [dB] | without polymer [dB] |
|---|---|---|---|---|---|---|
| 1 | 2.2% MgCl$_2$ Aqueous solution (aq. s.) | x | x | x | x | 10.4 |
| 2 | 2.2% MgCl$_2$ aq. s. + 0.1% polym. disp. | 4.4 | 53.7 | 5.3 | 14.7 | x |
| 3 | 2.2% MgCl$_2$ aq. s. + 20% polym. disp. | 6.0 | 46.3 | 5.5 | 42.4 | x |
| 4 | 2.2% MgCl$_2$ aq. s. + 95.4% polym. disp. | 4.5 | 6.7 | 19.6 | 16.5 | x |
| 5 | no. 3 + 0.3% bentonite | 9.0 | 9.6 | 10.7 | 49.2 | 24.0 |
| 6 | no. 3 + 5% bentonite | 11.0 | 9.2 | 39.7 | 49.2 | 44.1 |
| 7 | no. 3 + 40% bentonite | 14.1 | 17.0 | 33.1 | 25.3 | 47.7 |
| 8 | no. 3 + 0.3% sod.-alum. silicate | 9.0 | 9.8 | 11.7 | 51.2 | 16.0 |
| 9 | no. 3 + 5% sod.-alum. silicate | 8.2 | 24.2 | 15.7 | 59.7 | 20.1 |
| 10 | no. 3 + 20% sod.-alum. silicate | 24.3 | 15.6 | 17.3 | 34.3 | 20.5 |
| 11 | no. 3 + 0.3% kaolin | 7.4 | 8.8 | 12.0 | 49.2 | 21.7 |
| 12 | no. 3 + 5% kaolin | 26.7 | 4.9 | 10.7 | 49.2 | 45.2 |
| 13 | no. 3 + 20% kaolin | 57.2 | 53.7 | 42.4 | 47.7 | 46.3 |
| 14 | no. 3 + 0.3% titanium white | 6.5 | 9.2 | 8.4 | 49.2 | 17.8 |
| 15 | no. 3 + 20% titanium white | 18.9 | 6.8 | 53.7 | 51.2 | 45.2 |
| 16 | no. 3 + 40% titanium white | 47.7 | 53.7 | 53.7 | 53.7 | 42.4 |
| 17 | no. 3 + 0.1% silica | 7.6 | 5.3 | 12.2 | 53.7 | 21.7 |
| 18 | no. 3 + 5% silica | 49.2 | 9.3 | 59.7 | 57.2 | 31.2 |
| 19 | no. 3 + 10% silica | 59.7 | 35.3 | 47.7 | 44.1 | 32.9 |
| 20 | no. 3 + 0.3% synth. lime powder | 8.9 | 7.9 | 10.8 | 57.2 | 19.3 |
| 21 | no. 3 + 5% synth. lime powder | 12.1 | 8.6 | 7.3 | 51.2 | 42.4 |
| 22 | no. 3 + 20% synth. lime powder | 25.7 | 38.1 | 29.2 | 53.7 | 44.1 |
| 23 | no. 3 + 0.3% nat. lime powder | 9.1 | 10.0 | 14.8 | 49.2 | 21.1 |
| 24 | no. 3 + 5% nat. lime powder | 10.8 | 14.8 | 11.2 | 49.2 | 35.3 |
| 25 | no. 3 + 20% nat. lime powder | 16.9 | 27.4 | 15.9 | 47.7 | 46.3 |
| 26 | no. 3 + 0.3% dolomite powder | 8.6 | 8.5 | 11.9 | 63.2 | 17.8 |
| 27 | no. 3 + 5% dolomite powder | 8.6 | 10.6 | 11.8 | 49.2 | 16.4 |
| 28 | no. 3 + 20% dolomite powder | 39.1 | 28.4 | 34.3 | 49.2 | 40.3 |
| 29 | no. 3 + 0.3% talc | 8.0 | 8.0 | 9.9 | 51.2 | 16.9 |
| 30 | no. 3 + 5% talc | 8.5 | 7.9 | 11.5 | 51.2 | 42.4 |
| 31 | no. 3 + 20% talc | 17.7 | 29.6 | 25.4 | 57.2 | 44.1 |
| 32 | no. 3 + 0.01% defoamer | 7.6 | 8.2 | 11.8 | 48.4 | 19.7 |
| 33 | no. 3 + 0.6% defoamer | 7.8 | 9.5 | 14.5 | 46.3 | 18.6 |
| 34 | no. 3 + 5% defoamer | 7.0 | 7.0 | 10.6 | 41.6 | 17.7 |
| 35 | no. 3 + 0.01% dispersant | 5.6 | 7.8 | 11.3 | 49.2 | 21.2 |
| 36 | no. 3 + 0.6% dispersant | 7.9 | 7.1 | 9.1 | 53.7 | 16.2 |
| 37 | no. 3 + 5% dispersant | 6.0 | 6.1 | 11.2 | 43.2 | 16.5 |
| 38 | no. 3 + 0.1% poly(vinyl alcohol) | x | x | x | 53.7 | x |
| 39 | no. 3 + 0.3% poly(vinyl alcohol) | x | x | x | 46.3 | x |
| 40 | no. 3 + 5% poly (vinyl alcohol) | x | x | x | 47.7 | x |
| 41 | no. 3 + 0.1% carboxymethylcellulose | x | x | x | 46.3 | x |
| 42 | no. 3 + 0.3% carboxymethylcellulose | x | x | x | 53.7 | x |
| 43 | no. 3 + 1% carboxymethylcellulose | x | x | x | 47.7 | x |
| 44 | no. 3 + 0.01% BIOCIDE | x | x | x | 51.2 | x |
| 45 | no. 3 + 0.1% BIOCIDE | x | x | x | 53.7 | x |
| 46 | no. 3 + 0.6% BIOCIDE | x | x | x | 45.2 | x |
| 47 | 0.1% MgCl$_2$ aqueous solution | x | x | x | x | 0.6 |
| 48 | MgCl$_2$ saturated aqueous solution | x | x | x | x | 8.3 |

TABLE 11

| No. | PP nonwoven matrix | 2 kHz | 5 kHz | 10 kHz | 20 kHz | 50 kHz | 100 kHz | 200 kHz | 400 kHz |
|---|---|---|---|---|---|---|---|---|---|
| 1 | 2.2% MgCl$_2$ aqueous solution (aq. s.) | 84.4 | 68.7 | 54.8 | 40.5 | 25.0 | 14.1 | 8.1 | 5.3 |
| 2 | 2.2% MgCl$_2$ aq. s. + 0.6% propylene glycol | 93.9 | 87.0 | 77.2 | 61.8 | 42.2 | 26.7 | 14.8 | 9.3 |
| 3 | 2.2% MgCl$_2$ + 0.6% Euxyl K120 preservative | 96.5 | 93.6 | 88.5 | 77.9 | 58.1 | 39.1 | 20.3 | 9.3 |
| 4 | 2.2% MgCl$_2$ + 0.6% Euxyl K702 preservative | 95.4 | 92.1 | 86.4 | 77.1 | 57.4 | 38.5 | 23.9 | 14.0 |

TABLE 11-continued

| No. | PP nonwoven matrix | 2 kHz | 5 kHz | 10 kHz | 20 kHz | 50 kHz | 100 kHz | 200 kHz | 400 kHz |
|---|---|---|---|---|---|---|---|---|---|
| 5 | 2.2% MgCl$_2$ + 0.6% Euxyl 9010 preservative | 96.5 | 93.4 | 93.5 | 78.9 | 59.0 | 41.9 | 26.4 | 15.0 |
| 6 | 2.2% MgCl$_2$ + 0.6% Mystic Zen fragrance composition | 94.5 | 87.6 | 77.2 | 62.5 | 40.9 | 23.2 | 9.9 | 3.4 |

The invention claimed is:

1. A composition for application to a base material to render the base material able to shield alternating electromagnetic fields, the composition comprising:
   an aqueous solution of a hydratable salt;
   a modifier selected from the group consisting of acrylic dispersions, styrene-acrylic dispersions, silicone emulsions and combinations thereof; and
   an enhancing additive selected from the group consisting of surface active agents, aluminosilicates, silicates, soluble calcium compounds, insoluble calcium compounds, metal oxides, metalloid oxides, and combinations thereof, wherein the base material is shielded from alternating electromagnetic fields at least in the range of $10^{-2}$ Hz to $10^6$ Hz.

2. The composition of claim 1, wherein the surface active agents are compounds selected from the group consisting of detergents, surfactants, emulsifiers, amphiphiles, defoamers, dispersants, and glycols.

3. The composition of claim 1, wherein the aluminosilicates and silicates are compounds selected from the group consisting of bentonite, kaolin, and talc.

4. The composition of claim 1, wherein the insoluble calcium compounds are compounds selected from the group consisting of powdered limestone and dolomite.

5. The composition of claim 1, wherein the composition contains compounds selected from the group consisting of gypsum, calcium hydroxide, and Portland cement.

6. The composition of claim 1, wherein the composition contains a resin selected from the group consisting of alkyd resin in an organic solvent, epoxide resin in a solid state or a solution, phenol formaldehyde resin in ethanol, and silicone resin in a solution or a suspension.

7. An electric field shielding construction material comprising the composition of claim 1.

8. An EMF shielding material, comprising:
   a matrix material; and
   a composition according to claim 1 coated on or impregnated in the matrix material.

9. The EMF shielding material of claim 8, wherein the composition coated on or impregnated in the matrix material forms a construction material selected from the group consisting of primers, plaster/paint primers, paints, plastering mortars, laminates used in constructions, and textiles.

10. Electric field shielding furniture material comprising the composition of claim 1.

11. Electric field shielding clothing material comprising the composition of claim 1.

12. Electric field shielding textile material comprising the composition of claim 1.

* * * * *